Patented Jan. 29, 1935

1,989,243

UNITED STATES PATENT OFFICE 1,989,243

COLD MOLDING COMPOSITION AND ITS MANUFACTURE

Clarence A. Nash, North Caldwell, and Rupert S. Daniels, Newark, N. J., assignors to Bakelite Corporation, New York, N. Y., a corporation of Delaware No Drawing. Application April 17, 1930, Serial No. 445,199

9 Claims. (Cl. 51—280)

This invention relates to compositions containing phenolic resinoid or equivalent binders suitable for cold molding and to processes of obtaining them. By the terms phenolic resinoids and their equivalents it is intended to include products of a resinous nature which are characterized by an initial fusible and soluble condition, generally referred to as the potentially reactive or A condition on account of the capability of direct transformation into an infusible or C condition by the application of heat. They also include mixtures of permanently fusible resins or novolaks with so-called hardening agents, such as hexamethylenetetramine or its equivalents, that impart to the mixtures the potentially reactive character. Compositions of this nature also include fillers such as wood flour, asbestos, abrasive grains, etc. to give molding properties to the composition and to impart other useful properties.

Phenolic resinoid compositions are customarily molded hot, that is, the compositions are set to the final infusible condition while under pressure in the mold. It has long been recognized, however, that it is frequently desirable to mold such compositions in the cold and bake them in an oven after removal from the mold. Compositions demanding such a treatment are particularly those containing fillers having poor heat conductivity or where the thickness of the molded product is such that a long heating period is required to set the composition. A specific illustration where the cold molding process is generally required is in the manufacture of grinding wheels from a composition of abrasive grains and a resinoid binder.

The cold molding of phenolic condensation products was first proposed by Hemming in his Patent No. 1,125,906 granted January 19, 1915; cold molding is defined by Hemming in his book "Plastics and molded electrical insulation" (page 179) as including molding "in hot or cold molds, removing the pressed parts from the dies without cooling operation and hardening the molded products afterwards by means of heat". In order to obtain a cold molding mixture Hemming recommended that a mixture of phenol and excess formaldehyde employing ammonia as a catalyst be heated under a reflux condenser until the specific gravity reaches about 1.17 and the material be then incorporated with asbestos or other filler. In Patents Nos. 1,339,134 granted May 4, 1920, 1,358,394 granted November 9, 1920 and 1,368,753 granted Feb. 15, 1921 to Redman, serious objections to the method disclosed in the Hemming patent are pointed out, and these patents in turn propose the addition of unreacted or partially reacted resinoid ingredients to asbestos or other filler, molding the mixture and then completing the resinoid reaction during a subsequent baking. There are obvious limitations to the procedures outlined in the Redman patents; they are restricted to the use of resinoid ingredients giving an anhydrous reaction and require considerable proportions of free phenols in order to give the necessary flow in the molding operation, thereby necessitating the use of correspondingly large proportions of hexamethylenetetramine to impart to the mixture the required potentially reactive character and to bring about the desired transformation to the infusible state during the baking. Furthermore articles so made have been characterized by inferiority of surface and material shrinkage evidenced by warping or change of dimensions during the baking, this being in a large measure due to the high vapor pressures of the resinoid ingredients and their evolution at the baking temperatures (usually about 150-200° C.) Apart from their high vapor tension at elevated temperatures volatile solvents, such as alcohol and acetone that are customarily used in connection with phenol resinoid compositions, cannot be effectively used in compositions that are to be cold molded for the reason that if an insufficient amount of such a solvent is included the composition is apt to be crumbly and will not retain its form upon discharge from the mold and if too much of the solvent is added the composition has the tendency to stick to the mold surfaces; moreover with such solvents the resin must be in an intermediate reaction stage, which it is difficult to secure or control. As a consequence the art of cold molding phenolic resinoid compositions has remained in a substantially dormant condition until the disclosure of the process set out in the Patents 1,503,392 to Turkington granted July 29, 1924 and to Brock 1,537,454 granted May 12, 1925, according to which the evolution of gases or vapors during the baking operation is prevented by the inclusion of furfural or other aldehydes that react therewith as well as impart plasticity to the composition.

It has now been found that in order to obtain cold molded products, it is not essential that agents which have the property of reacting as well as plasticizing the mixture be included and that other high boiling point liquids having a solvent or wetting action on the resinoid can be used; by liquids having a solvent or wetting action are intended those liquids which are absorbed or enter into solution with the resinoid particles sufficiently to make them sticky so they will adhere to the abrasive grains as well as to each other. High boiling point solvents of a non-reactive character, i. e. solvents which do not react to a material degree with the resinoid or its ingredients, as hereinafter disclosed have the unexpected property of imparting the cohesion to a mixture necessary for cold molding so that a molded article can be removed from the mold without injury and thereafter baked. A further advantage of great importance from a commercial standpoint, obtained by the inclusion of a high boiling solvent in accordance with this invention, is that a composition can stand for several hours or even days before use without detrimental effect on the molding or on the cohesive property of the composition provided the solvent is without material reactive effect upon the resinoid constituents.

High boiling solvents of a non-reactive character found suitable for the purposes of this invention include hexaline, ethylene dichloride, ethylene glycol, diethylene glycol, diethyl oxalate, diethyl phthalate, diethyl carbonate, triethanolamine, cellosolve (i. e. monoethyl ether of ethylene glycol) and other glycol derivatives, etc. In general those liquids of a high boiling character that exert a wetting or a solvent action upon the resinoid particles sufficient to insure uniform distribution and to cause adherence upon the application of pressure, with or without heating of the molds or preheating of the molding composition, to thereby maintain the shape of the discharged molded piece come within the scope of this invention. Solvents of this nature can be used alone or in admixture with each other; or they can be used in conjunction with non-solvents, such as castor oil, creosote oil, etc. whereby increased toughness or other desirable technical effect may be obtained. Moreover a phenolic resinoid can be included in the liquids or their mixtures, preferably about 10 per cent or less, so as to form varnishes for coating the grit or filler; the phenolic resinoid in a powdered or comminuted condition is then added to the coated grit or filler to form a moldable composition.

In the practice of this invention the resinoid can be prepared in the customary manner by reacting a phenolic body with formaldehyde or other methylene-containing agent. If the resinoid ingredients selected are such that water is given off during the reaction the condensation product is preferably dehydrated and the reaction continued to the solid A or potentially reactive condition. The resinoid in this condition is preferably ground very fine, 100 to 200 mesh, and mixed with the filler and solvent; a suitable procedure to follow in mixing is dispersing the solvent throughout the filler and then stirring in the ground resinoid until a homogeneous appearance is obtained. The order of procedure may be varied, however, or a high boiling solvent may be included at any stage as for example with the raw ingredients entering into the resinoid reaction, particularly if the solvent is of such a character that it is not miscible with or does not form a constant boiling point mixture with water. The proportion of high boiling solvent included in the mixture can be varied within wide limits from 5 to 20% or more based on the resin content so long as the composition is not reduced to such a fluid condition that it will not retain its form upon discharge from the mold.

A typical abrasive mixture comprises about 350 grams of #50 Aloxite grains to which about 6 cc. of solvent is added and 50 grams of a ground potentially-reactive phenolic resinoid are incorporated with the wet grains. This is charged into a hot or cold mold and submitted to a pressure varying from 1000 to 3000 pounds to the square inch. The molded piece is discharged and baked for a period of about 24 hours at temperatures of about 80° to 160° C. depending upon the solvent used; the baking or heating transforms the resinoid to a substantially reacted condition or one where it is not affected by the usual solvents and is practically infusible. The density of the article, its porosity, freedom from concentration of hardened resinoid on the surface, etc. will vary with the proportions of the ingredients, the pressure used in the molding operation, and the liquid selected.

Insofar as grinding wheels are concerned strength is the paramount consideration and some comparative tests of molded samples are here given. In each case the proportions and ingredients are those recited as comprising a typical mixture, and the conditions of molding and baking are the same, the only change being the liquid used. Furfural is included in the list merely for the purpose of comparison.

| Solvent | Transverse strength |
| --- | --- |
| Furfural | 4683 |
| Hexaline (hexahydrophenol) | 4330 |
| Ethylene glycol | 4486 |
| Diethylene glycol | 4200 |
| Cellosolve with 10% resinoid | 4725 |

This invention, however, is not restricted to grinding wheels but is applicable to the manufacture of other abrasive implements or other articles including some other form of filler, such as asbestos fibre, that it may be found desirable to make by a cold molding process. With some types of fillers as asbestos it may be found preferable to include a volatile solvent with the mixture of reactive resinoid and high boiling solvent prior to the addition of the filler so as to obtain a uniform molding composition when the mass is kneaded or otherwise commingled; the volatile constituent is substantially removed before the composition is submitted to a molding operation or to a baking operation at temperatures sufficient to cause transformation of the resinoid binder to the infusible condition.

We claim:
1. Process of preparing molded articles which comprises mixing a filler with a powdered, solid heat-hardenable resin substantially free from volatile components and including in the mixture a solvent for the resin for imparting cohesion of the mass upon compression without heat, said solvent being characterized by substantial non-volatility at room temperatures such that the mixture does not materially change upon standing and also characterized by non-reactivity with the resin upon heating, cold molding the mixture into an article, and thereafter heating the molded article to effect a bonding action by the resin and transformation of the resin into a hardened state.

2. Process according to claim 1 in which the solvent comprises a glycol.

3. Process according to claim 1 in which the solvent comprises a monoethyl ether of ethylene glycol.

4. Moldable composition comprising a mixture of granular filler, a powdered solid resin of a heat-hardening type, and a solvent for the resin for causing coherence of the mass upon compression without heat, said solvent being characterized by substantial non-volatility at room temperature and non-reactivity with the resin upon heating.

5. Moldable composition according to claim 4 in which the solvent comprises a glycol.

6. Moldable composition according to claim 4 in which the solvent comprises a monoethyl ether of ethylene glycol.

7. Molded abrasive article comprising abrasive grains which have been coated with solvent for the resinous binder characterized by substantial non-volatility at room temperature and non-reactivity with the resin used as a binder for the abrasive grains, and a resin binder hardened by heating.

8. Article according to claim 7 in which the solvent is a glycol.

9. Article according to claim 7 in which the solvent is a monoethyl ether of ethylene glycol.

CLARENCE A. NASH.
RUPERT S. DANIELS.